United States Patent [19]

Jakobsson

[11] 4,357,289

[45] Nov. 2, 1982

[54] METHOD FOR THE PRODUCTION OF BUILDING ELEMENTS OF THE LIGHTWEIGHT CONCRETE TYPE

[76] Inventor: Per Å. H. Jakobsson, Blombergsvägen 24, 702 30 Örebro, Sweden

[21] Appl. No.: 226,759

[22] Filed: Jan. 21, 1981

[30] Foreign Application Priority Data

Jan. 31, 1980 [SE] Sweden ................................ 8000768

[51] Int. Cl.$^3$ ................................................ B29H 7/20

[52] U.S. Cl. ...................................... 264/42; 264/45.1; 264/71; 264/333

[58] Field of Search .................... 264/42, 45.1, 71, 333

[56] References Cited

U.S. PATENT DOCUMENTS

| | | | |
|---|---|---|---|
| 2,152,190 | 3/1939 | Henderson | 264/42 |
| 3,217,069 | 11/1965 | Williams | 264/42 |
| 3,442,991 | 5/1969 | Lanz | 264/42 |
| 3,595,947 | 7/1971 | Wielinga | 264/42 |
| 4,057,608 | 11/1977 | Hasimoto et al. | 264/333 |
| 4,067,939 | 1/1978 | Lowe et al. | 264/42 |
| 4,083,909 | 4/1978 | Göransson | 264/333 |
| 4,124,669 | 11/1978 | Urmston | 264/42 |

*Primary Examiner*—Donald E. Czaja
*Assistant Examiner*—W. Thompson
*Attorney, Agent, or Firm*—Larson and Taylor

[57] ABSTRACT

When producing building elements of lightweight concrete a viscous slurry is poured into a mould in order to form a stiff mould body. By means of parting planes this mould body is divided into individual elements of smaller sizes. According to the invention a plurality of zones having different densities and/or natures are formed in the mould body, the individual partin g plane being located within such a zone. Hereby one obtains building elements which include at least two portions having different densities and/or natures.

15 Claims, 22 Drawing Figures

METHOD FOR THE PRODUCTION OF BUILDING ELEMENTS OF THE LIGHTWEIGHT CONCRETE TYPE

Building elements made from lightweight concrete, more precisely in the form of steamcured aerated concrete, are basically produced by pouring into a mould a slurry or mass containing one or more silica materials, such as sand, shale ash or the like, a hydraulic binding agent, such as lime and/or Portland cement, water and a pore-forming agent, such as aluminium powder or foaming agents. This mass is allowed to expand or otherwise fill the mould and form a mould body which, after having achieved a semiplastic, self-supporting consistency, is provided with cuts or parting planes which divide the body into individual building elements of smaller sizes. Thereafter the body is caused to finally harden by steamcuring thereof at an elevated pressure and an elevated temperature, in addition to which the individual elements are separated from each other.

By varying the amount of the pore-forming agent in the mass the finished products may be given varying densities or weights by unit of volume. Commercially the products usually have densities of 0.4; 0.5 or 0.65 $kg/dm^3$.

In order to increase the insulating capacity of the products one aims at decreasing the density while simultaneously maintaining the compressive strength of the material. A considerable disadvantage in this connection is however that any reduction of the density results in a corresponding reduction of the impact resistance of the material. In order not to damage the products too much during transportation and handling thereof it has therefore been impossible in practice to commercially manufacture aerated concrete with a density being less than 0.4 $kg/dm^3$.

The present invention aims at eliminating the abovementioned disadvantage and creating opportunities for a production of aerated concrete products having an extremely low density as well as good impact resistance. According to the invention this is achieved by a method characterized by the steps of providing a number of zones having different densities and/or natures in said mould body and locating the individual parting plane within such a zone rather than in the interface between adjacent zones so as to provide individual elements each of which includes at least two portions having different densities and/or natures.

With reference to the attached drawings a closer description of a number of embodiments of the invention will follow below. In the drawings FIG. 1 is a cross section through a mould for casting different zones of material while using dummies, said dummies being shown as lowered into the mould, FIG. 2 is a similar cross section, but showing the dummies removed from the mould, FIG. 3 is a cross section illustrating the same mould during the final casting step, FIG. 4 illustrates how the mould body obtained according to FIGS. 1–3 is divided into individual buidling elements and FIGS. 5–7 illustrate an alternative embodiment of the invention.

Figure 22:
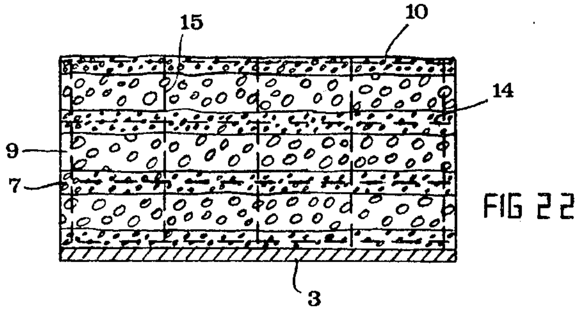

FIG. 22 finally is a cross section through a mould body illustrating a further alternative of the invention.

Figure 1:
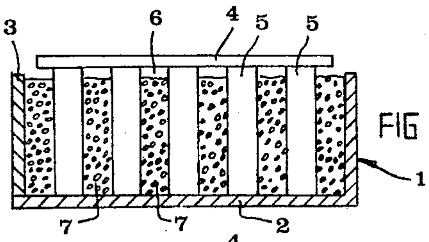

In FIGS. 1–4, 1 designates a mould (shown in cross section) advantageously being of the type which in addition to a bottom 2 comprises four walls, one of which—i.e. the wall 3—is detachably connected to the other walls and which wall is capable of forming a support for the cast mould body after turning of the mould 90°. FIG. 1 illustrates a number of dummies or space-forming bodies 5 supported by a common hanger 4, said dummies being lowered into the mould 1. More precisely said dummies are lowered so far that their bottom portions contact the mould bottom 2 while completely separating a number of empty spaces 6 from each other between the dummies in question.

Figure 2:
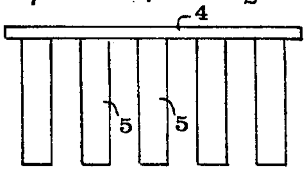

In a first casting step a number of first zones of a first mass 7 having a certain, suitably pre-determined density or weight by unit of volume is poured into said spaces 6. In practice the mass may consist of a conventional, or possibly modified aerated concrete mass of the art giving the finished material a density of 0.5 $kg/dm^3$. After casting and expansion to the full height the mass in the different part spaces is allowed to stiffen to a self-supporting semiplastic consistency. In the next step the dummies 5 are removed from the mould as illustrated in FIG. 2. Hereby empty spaces 8 are formed between the stiffened mass zones 7 first cast. Now, in these spaces a second mass 9 having another density than the density of the first mentioned mass zones 7 is casted in a second step illustrated in FIG. 3. The density of the mass 9 may range between 0.10 and 0.30, suitably between 0.15 and 0.25 $kg/dm^3$, also the mass 9 suitably being of the aerated concrete type. In this way one achieves the effect that the different mass zones are intimitely bound or adhered to each other when the second mass 9 expands and starts stiffening. Thus, by the casting steps described one obtains a mould body generally designated 10, said body being composed of alternating heavy and light zones of material 7 and 9 respectively.

Figure 8:
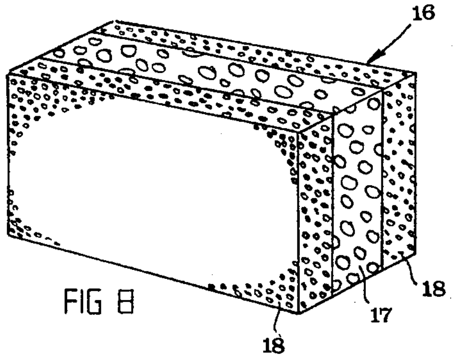
FIG. 8 is a perspective view showing a building element produced according to the method illustrated in FIGS. 1–4 and FIG. 9 is a similar view showing an element produced according to the method illustrated in FIGS. 5–7.

In the next step the mould body 10 is rotated at the same time as the mould shell is removed so that the body will rest edgeways on the wall 3 now acting as a support. In this condition the body 10 is fed through the cutting or dividing station 11 shown in FIG. 4, said station including a suitable number of horizontal, vertically spaced-apart wires 12 which are stretched between uprights 13 in a manner known per se. As appears from FIG. 4 the distance between the wires 12 is chosen in such a way that adjacent wires will cut through the mould body in horizontal cuts or parting planes 14 located in every second mass zone; in this case those mass zones 7 which have the highest density. Furthermore the station 11 includes wires (not shown) by means of which the mould body is provided with vertical cuts too. Such a vertical cut is shown at 15 in FIG. 4. After the dividing operation in the station 11 the mould body 10 is conveyed into an autoclave in which it is conventionally steamcured, whereupon the different elements delimited by the cuts 14 are separated from each other. In doing so one obtains elements 16 of the structure illustrated in FIG. 8, i.e. a substantially parallelepipedic element comprising a core 17 consisting of lightweight material, said core being on either side surrounded by two parallel layers of material 18 being less porous and consequently having a greater impact resistance than the core 17.

Figure 5:
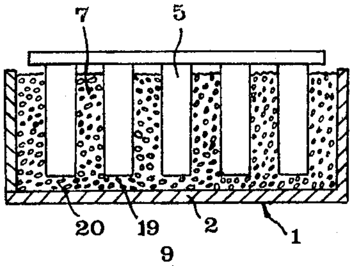
Figure 6:
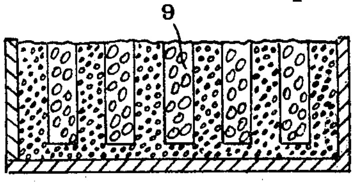
Figure 4:
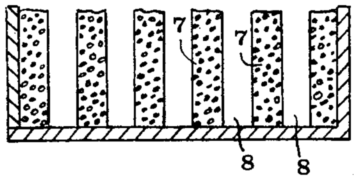
Figure 4:
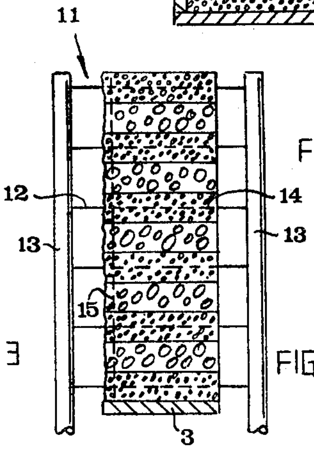
Figure 7:
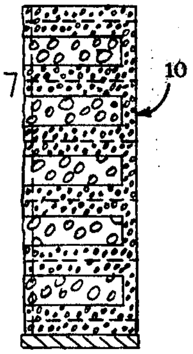
Figure 3:
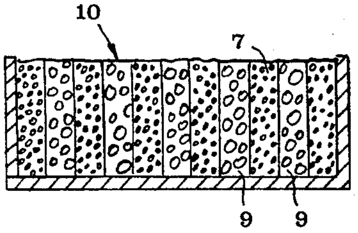
Figure 9:
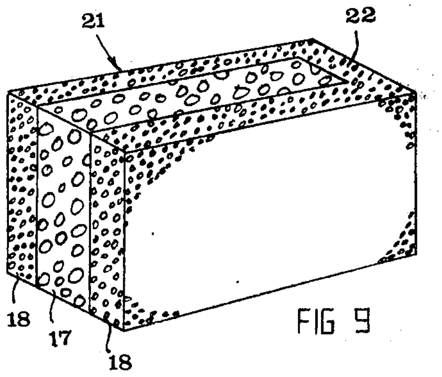

In FIGS. 5 to 7 an alternative embodiment is illustrated which differs from the preceding one in that the dummies 5 put down substantially vertically into the mould 1 are held with their bottom portions 19 on a certain level above the mould bottom 2 when the first mass 7 is cast. See FIG. 5. Hereby the mass will be spread in a bottom layer 20 which after the casting of the second mass 9 according to FIG. 6 and the cutting of the mould body 10 obtained according to FIG. 7 will result in individual building elements 21 of the structure shown in FIG. 9. In addition to the core 17 and the two parallel cover layers 18 these elements have a third cover layer 22 which extends perpendicularly to the layers 18 and which covers and protects also one of the ends of the core 17.

Figure 10:
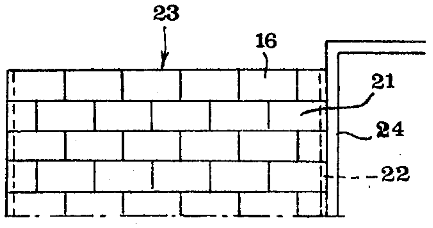
FIG. 10 illustrates schematically a portion of a wall erected by means of elements according to FIGS. 8 and 9.

FIG. 10 discloses an example of how the elements 16 and 21 may be used together in a wall 23 in such a way that strong material layers are obtained not only along the proper wall surfaces (thanks to the cover layers 18 having a comparatively high density), but also at the corners of the wall and at the connection for instance to the case or frame 24 (thanks to the cover layers 22).

Figure 11:
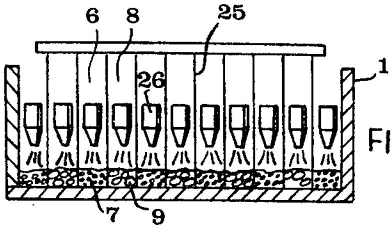
FIGS. 11 and 12 are cross sections through a mould during two different casting steps involved in a third alternative method according to the invention and FIG. 13 is a cross section through a mould body obtained in accordance with this method, the body being sawn during the cutting thereof.
Figure 12:
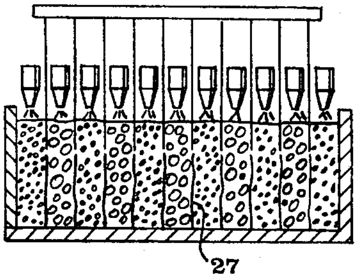
Figure 13:
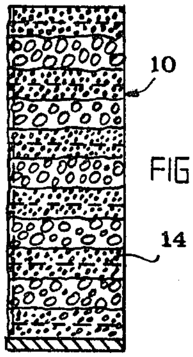

Now, reference is made to FIGS. 11 to 13 which schematically illustrate a further alternative embodiment of the invention. In this embodiment a number of plates or partition walls 25 are inserted vertically into the mould 1 so as to separate a corresponding number of part spaces 6, 8 from each other. In each of those part spaces there is at least one nozzle or casting device 26. FIG. 11 illustrates an initial stage of a casting operation during which stage masses 7 and 9 having different densities are cast substantially simultaneously into every second part space by means of said nozzles. As the masses gradually fill the part spaces and start to expand not only the nozzles but also the partition walls 25 are lifted as shown in FIG. 12. In doing so adjacent masses will flow into one another while giving rather irregular interfaces 27 between the different masses. This is however no disadvantage whatsoever in that the parting cuts 14 are located at adequate distances from the interfaces in question when the mould 10 is cut in the manner previously described as indicated in FIG. 13.

The partition walls 25 shown in FIGS. 11 and 12 may also be used in the same manner as the dummies 5 according to FIGS. 1 to 6. In other words the first mass 7 may be cast in every second part space and allowed to stiffen before the walls or plates are removed, the second mass 9 being cast in the spaces between the material zones already formed. It is also possible to produce elements 21 of the type shown in FIG. 9, i.e. by holding the bottom edges of the partition walls 25 on a certain level above the mould bottom and by casting in an initial stage merely the first mass 7 which is allowed to be spread in a bottom layer in the mould before the casting of the second mass 9 is started in every second part space.

According to a specific embodiment of the invention it is possible to simultaneously cast alternating material zones 7 and 9 respectively without using any partition walls, the masses being cast directly out of the nozzles 26 and allowed to flow into one another in irregular interfaces.

In the embodiments described above the various mass or material zones have been shown with substantially the same thickness. In practice the thickness of the various zones may however be varied in any arbitrary manner, preferably so that the more porous zones 9 are made a great deal thicker than the zones 7, wherebythe more resistant layers 18 of the finished elements 16, 21 get the character of comparatively thin surface coatings on the core 17.

According to another aspect of the invention one of two material zones having different densities and/or natures may be formed by acting mechanically on the mass cast into the mould, said action taking place before the mass finally hardens. This can be carried out by subjecting one or more zones of the mass to a vibratory or oscillating operation, the density of the zone being changed in comparison to the density of the surrounding portions of the mould body. By changing the density the individual building element will obtain a surface coating having a nature that differs from the nature of the remaining portion of the element.

Figure 14:
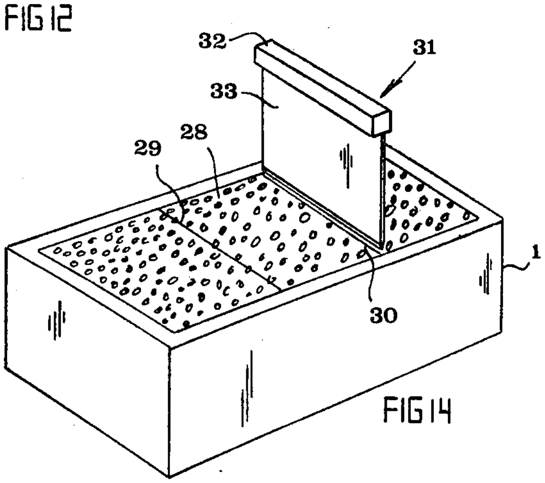
FIG. 14 is a perspective view of a mould used in accordance with a fourth alternative of the invention and FIGS. 15 and 16 part sections through a mould body according to this alternative.
Figure 15:
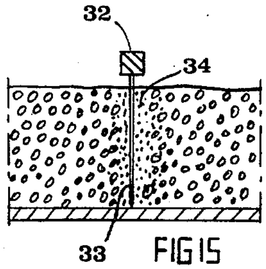
Figure 16:
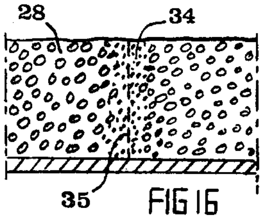

FIG. 14 discloses a mould 1 filled with a slurry or casting mass 28 for the production of aerated concrete elements which are delimited by means of the helping lines 29, 30. The mould cooperates with a vibrator 31 which comprises a holder 32 and a disk 33. The disk 33 is immersed into the mass 28 at the locations indicated by the helping lines 29, 30. FIG. 15 illustrates a disk 33 immersed into the mass. The disk is subjected to a vibratory motion, meaning that the zone 34 in the mass on either side of the disk will get a modified density in comparison to the mass outside said zone as appears from FIGS. 15 and 16. The disk more or less forms a symmetry plane for the zone 34. When the mass reaches the desired degree of stiffness the mould body obtained is removed from the mould and divided by cuts 35 as appears from FIG. 16, said cuts forming symmetry planes for the zones 34. Thereafter the mould body is subjected to a steamcuring operation. After this curing the three elements involved in the mould body are separated from each other. Then the outer elements get one surface with a surface coating having a density which differs from the density of the remaining portion of the element, while the middle element on the contrary has two opposite surfaces with coatings the density of which differs from the density of the remaining portion of the element.

Figure 17:
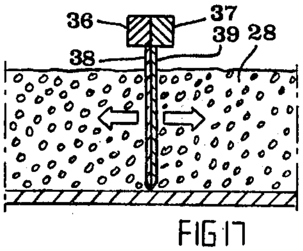
FIGS. 17 and 18 are part sections through a mould body illustrating a fifth embodiment of the invention.
Figure 18:
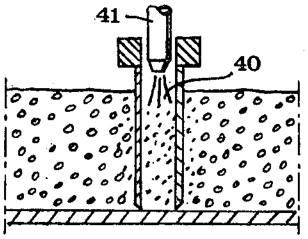

Instead of subjecting the mass to a vibratory action one may form a zone having no mass. This may be done by inserting two plates 38, 39 attached to holders 36 and 37 respectively into the mass 28 at the helping lines 29, 30. See FIG. 17. When the plates in question have been inserted into the mass they are moved away from each other so as to provide an empty space 40 as appears from FIG. 18. FIG. 18 also discloses how the space 40 may be filled with a substrate of a suitable type by means of a nozzle 41. Like before the substance may for instance consist of a liquid mass or slurry for the production of aerated concrete. The substance may also consist of suspended particles obtained from scraped-off aerated concrete material. Also mortars or other substances based on hydraulic binding agents may be used. The substance could be chosen in such a manner that the material in the zone filled allows cutting when the material is stiffened or hardened. When the space 40 is filled the plates 38 and 39 are removed, whereupon cutting and curing the mould body follows.

Figure 19:
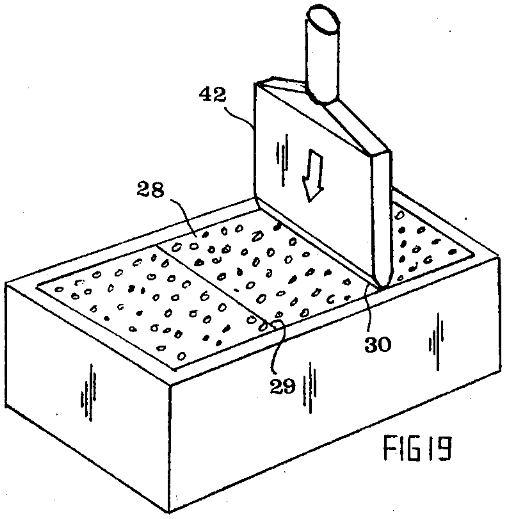
FIGS. 19 to 21 illustrate a sixth alternative method.
Figure 20:
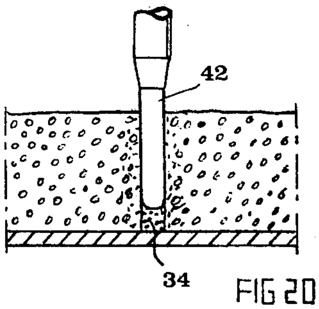
Figure 21:
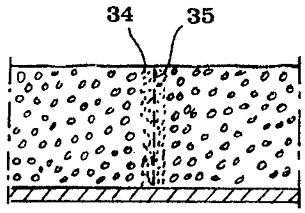

In FIGS. 19 to 21 a zone is provided by using a combined pushing and pouring device 42. This device is inserted into the mass 28 at the helping lines 29, 30. During the insertion into the mass a certain amount thereof is pushed aside and compressed as appears from FIG. 20. The device is inserted right down to the bottom of the mould. When being removed from the bottom the device fills the space provided with a liquid mass which may be of the same type as the mass used according to FIG. 18. FIG. 21 illustrates a zone 34 in which the mass is filled and in which a cut 35 has been applied in the manner previously described.

When substance is supplied to the mass the substance in question should have such properties that the mould body cast can be divided without difficulties by cutting, sawing or another suitable method of separation in spite of the existence of said substance. Further said substance should have a good adhesivity towards the mass.

In the foregoing the mass has been supplied with another substance which has filled up an uncovered zone. Instead of uncovering a zone it is also conceivable to inject into a zone filled up with mass one or more different substances which are injected in the mass situated in that zone. The substances which may be involved in an injection operation should, like other substances of addition too, withstand steamcuring at about 200° C. and give the surface properties desired.

In the foregoing embodiments have been disclosed in which the various zones of mass or material have extended vertically in the mould. It is however also possible to let the zones in question extend horizontally as shown in FIG. 22. In this embodiment alternating heavy and light mass layers 7 and 9 respectively are poured or cast on each other to the height desired while forming a mould body 10 which is divided by means of horizontal as well as vertical cuts 14, 15.

In all of the above mentioned embodiments at least one of the masses is intended to be of the aerated concrete forming type, i.e. consisting of a material mixture including silica substances, hydraulic binding agents, water and pore-forming agents. The invention is however also fit for use in connection with other masses of the lightweight concrete type in general, e.g. masses including porous light fillers of different types. Furthermore the invention is not merely restricted to the use of masses having different densities or weights by unit of volume in that the invention may also be used in connection with masses which generally have different natures or characters. Thus, according to a special feature of the invention one of the masses may—whether it has the same density as the other mass or not—be modified in a suitable manner, for instance in comparison with the conventional aerated or lightweight concrete mass. The modification may consist of an admixture of hydrophobation agents, polymers and/or cellular plastics balls into the masses. It is particularly preferred to admix a hydrophobation agent such as silanes or siloxanes to the mass which will form the cover layers 18 of the finished elements 16, 21 and possibly admix cellular plastics balls to the mass which will form the core 17.

Other variants of the invention are conceivable too. Thus, the sequence in which the masses are poured into the mould is not critical, meaning that a lightweight mass may be poured before, at the same time as or after a heavy mass. The division of the mould body into individual elements may be carried out either before or after the curing of the material. Though unreinforced elements only have been illustrated in the drawings the method may of course also be used in connection with the manufacture of reinforced products of different types.

I claim:

1. In a method for the production of building elements of lightweight concrete which comprises providing a viscous slurry or mass in a mould to form a moulded body, stiffening the body, and cutting the stiffened body into a plurality of individual building elements of smaller size than the moulded body, the improvement which comprises providing a plurality of zones of slurry or mass having different density and/or nature in said moulded body, and cutting the stiffened body along a plane within said zone rather than along an interface between adjacent zones, to provide said plurality of building elements whereby the individual building elements each include at least two portions having a different density and/or nature.

2. An improved method according to claim 1 wherein said plurality of zones are provided by forming a plurality of spaced apart first zones of a first slurry or mass having a first density and/or nature, stiffening said first slurry or mass in said first zones into at least a self-supporting condition, and forming a plurality of spaced apart second zones of a second slurry or mass having a second density and/or nature differing from said first density and/or nature, and stiffening said second slurry or mass in said said second zones.

3. An improved method according to claim 2 wherein said second zones are formed while said first zones have a semiplastic consistency.

4. An improved method according to claim 3 wherein said first and second zones are formed by casting each at substantially the same time.

5. An improved method according to claim 4 wherein members comprising partition walls are inserted between said first and second zones in said mould to keep apart the first and second cast slurries or masses therein.

6. An improved method according to claim 5 wherein said partition walls are removed from said mould at the latest in connection with casting said second slurry or mass.

7. An improved method according to claim 2 which comprises introducing a plurality of members comprising mutually spaced-apart dummies between which said first slurry or mass is cast, removing said dummies after stiffening of said first slurry or mass, and casting said second slurry or mass into the spaces created by removal of said dummies.

8. An improved method according to claims 5, 6 or 7 wherein said members are inserted substantially vertically downwardly into the mould such that the bottom of said partition walls or dummies, respectively, are positioned a distance above the bottom of said mould such that, when said first slurry or mass is cast, a layer of said first slurry or mass extends along the bottom of said mould, and cutting the stiffened body along planes within said plurality of spaced apart first zones whereby each of said building elements comprises a second zone surrounded on at least two sides by said first zone, said sides extending at an angle relative to each other.

9. An improved method according to claim 1 wherein said plurality of zones are provided by casting a slurry or mass in said mould, and mechanically working thereon before the slurry or mass hardens.

10. An improved method according to claim 9 wherein the mechanical working step comprises subjecting the cast slurry or mass to local vibration.

11. An improved method according to claim 1 wherein said plurality of zones are provided by providing a first slurry or mass in said mould, displacing or removing a portion of said cast slurry or mass to provide a space in the cast slurry or mass, and introducing a second slurry or mass into said space.

12. An improved method according to any one of claims 1, 2, 3, 4, 5, 6, 7, 9, 10 or 11 wherein said viscous slurry or mass comprises a casting mass suitable for forming hydrothermally cured aerated concrete and wherein the building elements are hardened by steam curing.

13. An improved method according to claim 12 wherein at least one of said zones of different density and/or nature comprises a member selected from hydrophobation agents, polymers, and cellular plastic particles.

14. An improved method according to claim 1 wherein said plurality of zones are formed by providing first and second slurries or masses in said mould and wherein said second slurry or mass is provided when said first slurry or mass is in a semi-plastic state.

15. An improved method according to claim 1 wherein said zones have different densities and wherein said stiffened body is cut along a plane which has the higher density.

* * * * *